US006349479B1

(12) United States Patent
Bottega

(10) Patent No.: US 6,349,479 B1
(45) Date of Patent: Feb. 26, 2002

(54) RULER FOR GUIDING A BLADE AND FOR PROVIDING SHIELDING PROTECTION FROM THE BLADE FOR THE HAND HOLDING THE RULER

(76) Inventor: Philip M. Bottega, 67 Buck Rd., East Brunswick, NJ (US) 08816

(*) Notice: Subject to any disclaimer, the term of this patent is extended or adjusted under 35 U.S.C. 154(b) by 0 days.

(21) Appl. No.: 09/712,851

(22) Filed: Nov. 13, 2000

(51) Int. Cl.$^{7}$ ............................ G01B 3/04; B26B 29/06

(52) U.S. Cl. .............................. 33/481; 33/492; 33/493

(58) Field of Search ........................... 33/481, 493–489, 33/491–494; D10/71; D8/98

(56) References Cited

U.S. PATENT DOCUMENTS

| | | | | |
|---|---|---|---|---|
| 185,102 A | | 12/1876 | Hays | 33/483 |
| 287,480 A | | 10/1883 | Smith | 33/483 |
| 330,124 A | | 11/1885 | Jewell | 33/485 |
| 566,195 A | | 8/1896 | Leavitt | 33/485 |
| 722,141 A | | 3/1903 | Probst | 34/89.2 |
| 743,119 A | | 11/1903 | Watson, Jr. | 34/89.2 |
| 781,117 A | | 1/1905 | Willits | 33/274 |
| 963,001 A | | 6/1910 | Dibrell | 33/485 |
| 3,087,250 A | | 4/1963 | Blue | 33/484 |
| D208,666 S | | 9/1967 | Fresno | D10/61 |
| 3,406,456 A | * | 10/1968 | Schleich | 33/492 |
| 4,312,133 A | * | 1/1982 | Mima | 33/468 |
| 4,339,881 A | * | 7/1982 | Kapp | 33/444 |
| D280,081 S | | 8/1985 | Groves | D10/71 |
| D292,296 S | | 10/1987 | Wood | D19/35 |
| 4,987,812 A | | 1/1991 | Benavidez | 83/455 |
| 5,138,759 A | * | 8/1992 | Gruetzmacher | 29/467 |
| 5,279,041 A | * | 1/1994 | Wright | 33/379 |
| 5,471,755 A | | 12/1995 | Haskell | 33/485 |
| D374,404 S | * | 10/1996 | Kidd | D10/71 |
| D390,078 S | | 2/1998 | Williams | D8/14 |
| 5,842,402 A | | 12/1998 | Collier | 83/745 |
| 5,873,171 A | * | 2/1999 | Hsu | 33/484 |

FOREIGN PATENT DOCUMENTS

| | | | | |
|---|---|---|---|---|
| DE | 1002661 | | 2/1957 | 33/483 |
| DE | 3106-176 A1 | * | 9/1982 | 33/489 |

* cited by examiner

*Primary Examiner*—Diego Gutierrez
*Assistant Examiner*—R. Alexander Smith
(74) *Attorney, Agent, or Firm*—Richard L. Miller, P.C.

(57) ABSTRACT

A ruler that guides a blade and provides shielding protection from the blade for the hand of a user not holding the blade, not only when the blade is drawn along the ruler and cuts a sheet of material, but also if the blade should be lifted and accidentally dropped during use. The ruler includes a base a shield, and successive numerical indicia. The base has an uppermost surface with a first recess therein that extends a substantial amount thereof and which is completely filled with a first pad of anti-skip material that provides cushioned comfort for, and prevents the hand of the user not holding the blade from skipping along the base when stabilizing and holding the ruler down.

20 Claims, 1 Drawing Sheet

RULER FOR GUIDING A BLADE AND FOR PROVIDING SHIELDING PROTECTION FROM THE BLADE FOR THE HAND HOLDING THE RULER

BACKGROUND OF THE INVENTION

1. Field of the Invention

The present invention relates to a ruler. More particularly, the present invention relates to a ruler for guiding a blade and for providing shielding protection from the blade for the hand of a user not holding the blade, not only when the blade is drawn along the ruler and cuts a sheet of material, but also if the blade should be lifted and accidently dropped during use.

2. Description of the Prior Art

Numerous innovations for rulers have been provided in the prior art that will be described. Even though these innovations may be suitable for the specific individual purposes to which they address, however, they differ from the present invention.

A FIRST EXAMPLE, U.S. Pat. No. Des. 208,666 to Fresco teaches the ornamental design for a dual straightedge.

A SECOND EXAMPLE, U.S. Pat. No. Des. 280,081 to Groves teaches the ornamental design for a combined measuring stick and back scratcher.

A THIRD EXAMPLE, U.S. Pat. No. Des. 292,296 to Wood teaches the ornamental design for a parallel straightedge.

A FOURTH EXAMPLE, U.S. Pat. No. 185,102 to Hays teaches a ruler provided with a longitudinal slot or aperture extending therethrough, substantially as and for the purpose specified.

A FIFTH EXAMPLE, U.S. Pat. No. 287,480 to Smith teaches a sheet metal ruler having near one edge a longitudinal bend or corrugation, a', and at an equal distance from its other edge a similar but opposite bend, c'.

A SIXTH EXAMPLE, U.S. Pat. No. 330,124 to Jewell teaches a ruler consisting of the ruler-plate, the soft-rubber cross-pieces, and the handle.

A SEVENTH EXAMPLE, U.S. Pat. No. 566,195 to Leavitt teaches as a new article of manufacture, a ruler provided on its bottom face with a cylindrical elastic cord or string partly embedded therein and extending longitudinally of the ruler.

AN EIGHTH EXAMPLE, U.S. Pat. No. 722,141 to Probst teaches a combined ruler and blotter consisting of a ruler provided with guides, and a blotter held by said guides, the guides being set in from the edges of the ruler, said edges being of a single thickness and unturned.

A NINTH EXAMPLE, U.S. Pat. No. 743,119 to Watson, Jr. teaches an article of manufacture comprising a plate having upwardly and reversely turned ends, and a blotter-strip secured to such plate by having its ends brought over and tucked under the upwardly and reversely turned ends of the plate.

A TENTH EXAMPLE, U.S. Pat. No. 781,117 to Willits teaches a rule composed of two flanges placed in planes at right angles to each other, with the exterior side or face of one or of both of said flanges provided with a surface that will reflect the image of lines drawn on a surface lying in a plane with the exterior side or face of the other of said flanges.

AN ELEVENTH EXAMPLE, U.S. Pat. No. 963,001 to Dibrell teaches a combined ruler and paper cutter comprising a paper cutter member consisting of a rectangular sheet having a scale thereon and a ruler formed by rebending a portion of one of the longitudinal side portions of the sheet and then curving the remainder of the side portion outwardly and downwardly to a point in advance of the adjacent side of the sheet and until the edge of the said curved portion is in a plane with the said rebent portion.

A TWELFTH EXAMPLE, U.S. Pat. No. 3,087,250 to Blue teaches a rule holder adapted to slidably engage and hold a triangular rule on a drawing surface comprising an inverted U-shaped body having two legs and a bight portion, said legs positioned to engage opposite sides of a triangular rule and to support the bight portion slightly above the uppermost portion of the rule, a finger rest holding member extending outwardly from said body on the side opposite from the working edge of the rule, and a foot member carried by said finger rest holding member engaging said drawing surface thereby enabling said holder to be moved laterally along the rule and the drawing surface.

A THIRTEENTH EXAMPLE, U.S. Pat. No. 4,987,812 to Benavidez teaches a flat elongated body member that has indicia markings on its top surface and a slot is provided in such top surface in which a cutter member is slidably guided. The cutter member has a rearward portion biased to an upwardly angled positioned by a spring. Such rearward portion supports a cutter blade on one side of the cutter member so as to lie closely adjacent one side edge of the body member. In the upper angled position of the rearward portion of the cutter member the cutting edge of the blade is disposed above the bottom surface of the body member but protects below such bottom surface in a cutting position when the rearward portion of the cutter member is forced downwardly. The cutter member includes a compartment for the storage of store cutter blades. Also the body member has one or more lateral projections for alignment in cutting functions.

A FOURTEENTH EXAMPLE, German Pat. No. 1,002, 661, dated Feb. 14, 1957.

It is apparent that numerous innovations for rulers have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a ruler for guiding a blade and for providing shielding protection from the blade for the hand of a user not holding the blade, not only when the blade is drawn along the ruler and cuts a sheet of material, but also if the blade should be lifted and accidently dropped during use that avoids the disadvantages of the prior art.

ANOTHER OBJECT of the present invention is to provide a ruler for guiding a blade and for providing shielding protection from the blade for the hand of a user not holding the blade, not only when the blade is drawn along the ruler and cuts a sheet of material, but also if the blade should be lifted and accidently dropped during use that is simple and inexpensive to manufacture.

STILL ANOTHER OBJECT of the present invention is to provide a ruler for guiding a blade and for providing shielding protection from the blade for the hand of a user not holding the blade, not only when the blade is drawn along the ruler and cuts a sheet of material, but also if the blade should be lifted and accidently dropped during use that is simple to use.

BRIEFLY STATED, STILL YET ANOTHER OBJECT of the present invention is to provide a ruler that guides a blade and provides shielding protection from the blade for the hand of a user not holding the blade, not only when the blade is drawn along the ruler and cuts a sheet of material, but also if the blade should be lifted and accidentally dropped during use The ruler includes a base a shield, and successive numerical indicia. The base has an uppermost surface with a first recess therein that extends a substantial amount thereof and which is completely filled with a first pad of anti-skip material that provides cushioned comfort for, and prevents the hand of the user not holding the blade from skipping along the base when stabilizing and holding the ruler down, and a lowermost surface with a second recess therein that extends a substantial amount thereof and which is completely filled with a second pad of anti-skip material that prevents the ruler from skipping along the sheet of material to be cut when the hand of the user not holding the blade stabilizes and holds the ruler down. The shield extends skewly rearwardly upwardly from the base, at an acute angle, to an elevation sufficient that allows the shield to cover, and isolate, the hand of the user not holding the blade, and as a result thereof, provides shielding protection from the blade for the hand of the user not holding the blade. The successive numerical indicia forms a scale that extends along, and is demonstrative of intervals of the length of, the base for use in measuring.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows.

LIST OF REFERENCE NUMERALS UTILIZED IN THE DRAWING

Figure 1:
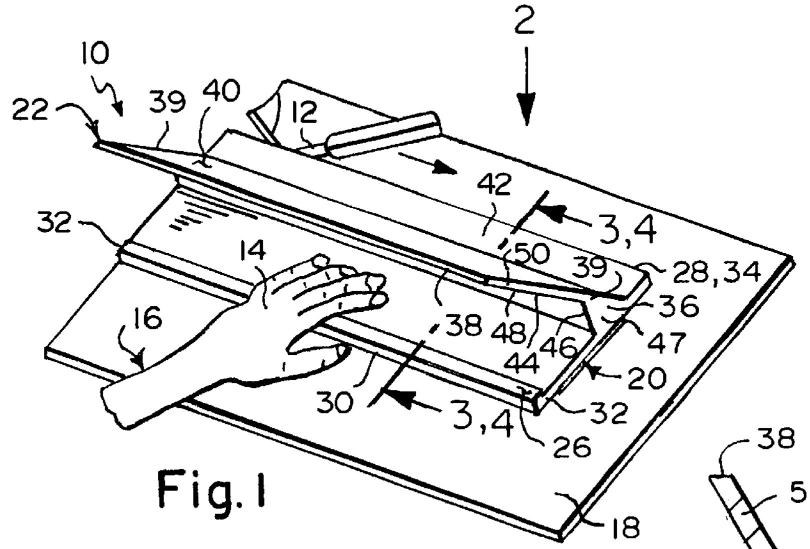
FIG. 1 is a diagrammatic perspective view of the present invention in use.

10 ruler of present invention for guiding blade 12 and for providing shielding protection from blade 12 for hand 14 of user 16 not holding blade 12, not only when blade 12 is drawn along ruler 10 and cuts sheet of material 18, but also if blade 12 should be lifted and accidentally dropped during use
12 blade
14 hand of user 16
16 user
18 sheet of material
20 base for overlying sheet of material 18 to be cut and for guiding blade 12
22 shield for facilitating carrying and placing of ruler 10 and for providing shielding protection from blade 12 for hand 14 of user 16 not holding blade 12, not only when blade 12 is drawn along ruler 10 and cuts sheet of material 18, but also if blade 12 should be lifted and accidentally dropped during use
24 lowermost surface of base 20 for overlying sheet of material 18 to be cut
26 uppermost surface of base 20 for having hand 14 of user 16 not holding blade 12 engage thereupon
28 leading edge of base 20 for guiding blade 12
30 trailing edge of base 20
32 pair of ends of base 20
34 blunt leading edge of leading edge 28 of base 20 for guiding blade 12 for preventing blade 12 from deflecting relative rearwardly should a minute deviation in alignment of blade 12 occur, as opposed to being beveled, which would cause blade 12 to deflect relative rearwardly should a minute deviation in alignment of blade 12 occur during use, and as a consequence thereof, cause injury to hand 14 of user 16
36 lowermost edge of shield 22
38 uppermost edge of shield 22 for allowing shield 22 to cover, and isolate, hand 14 of user 16 not holding blade 12, and as a result thereof, shield 22 provides shielding protection from blade 12 for hand 14 of user 16 not holding blade 12, not only when blade 12 is drawn along ruler 10 and cuts sheet of material 18, but also if blade 12 should be lifted and accidently dropped during use
39 pair of ends of shield 22
40 front surface of shield 22
41 successive numerical indicia for use in measuring
42 space of uppermost surface 26 of base 20
43 sheet of instructions of shield 22 for instructing user 16 in safely using blade 12 in conjunction with ruler 10
44 back surface of shield 22
46 lower portion of back surface 44 of shield 22
47 broadened lower portion of shield 22
48 upper portion of back surface 44 of shield 22
50 narrowed upper portion of shield 22
52 first recess in uppermost surface 26 of base 20
53 rearmost extreme of first recess 52 in uppermost surface 26 of base 20
54 second recess in lowermost surface 24 of base 20
56 first pad of anti-skip material of base 20 for providing cushioned comfort for, and preventing hand 14 of user 16 not holding blade 12 from skipping along base 20 when stabilizing and holding ruler 10 down
58 second pad of anti-skip material of base 20 for preventing ruler 10 from skipping along sheet of material 18 to be cut when hand 14 of user 16 not holding blade 12 stabilizes and holds ruler 10 down
60 blade rail of blunt leading edge 34 of base 20 for guiding blade 12
62 blindslot in blunt leading edge,34 of base 20

DETAILED DESCRIPTION OF THE PREFERRED EMBODIMENT

Referring now to the figures, in which like numerals indicate like parts, and particularly to FIG. 1, the ruler of the present invention is shown generally at 10 for guiding a blade 12 and for providing shielding protection from the blade 12 for the hand 14 of a user 16 not holding the blade 12, not only when the blade 12 is drawn along the ruler 10 and cuts a sheet of material 18, but also if the blade 12 should be lifted and accidentally dropped during use.

The configuration of the ruler 10 can best be seen in FIGS. 1–4, and as such, will be discussed with reference thereto.

The ruler 10 comprises a base 20 for overlying the sheet of material 18 to be cut and for guiding the blade 12.

The ruler 10 further comprises a shield 22 that extends upwardly from the base 20 for facilitating carrying and placing of the ruler 10 and for providing shielding protection from the blade 12 for the hand 14 of the user 16 not holding the blade 12, not only when the blade 12 is drawn along the ruler 10 and cuts the sheet of material 18, but also if the blade 12 should be lifted and accidentally dropped during use.

The base 20 is rigid, elongated, thin, flat, and rectangular-shaped.

The base 20 has a length, a lowermost surface 24 that is flat for overlying the sheet of material 18 to be cut, an uppermost surface 26 that is flat, and disposed above, and parallel to, the lowermost surface 24 thereof for having the hand 14 of the user 16 not holding the blade 12 engage thereupon, a leading edge 28 that has a length and is straight for guiding the blade 12, a trailing edge 30 that is straight, and disposed behind, and parallel to, the leading edge 28 thereof, and a pair of ends 32 that are straight and parallel to each other and perpendicular to both the leading edge 28 thereof and the trailing edge 30 thereof, by virtue of the base 20 being rectangular-shaped.

The leading edge 28 of the base 20 is blunt so as to form a blunt leading edge 34 for preventing the blade 12 from deflecting relative rearwardly should a minute deviation in alignment of the blade 12 occur during use, as opposed to being beveled, which would cause the blade 12 to deflect relative rearwardly should a minute deviation in alignment of the blade 12 occur during use, and as a consequence thereof, cause injury to the hand 14 of the user 16.

The shield 22 is rigid, elongated, thin, flat, and rectangular-shaped.

The shield 22 extends skewly rearwardly upwardly, at a lowermost edge 36 thereof that is straight, from the uppermost surface 26 of the base 20, to an uppermost edge 38 thereof that is straight and at an elevation sufficient for allowing the shield 22 to cover, and isolate, the hand 14 of the user 16 not holding the blade 12, and as a result thereof, the shield 22 provides shielding protection from the blade 12 for the hand 14 of the user 16 not holding the blade 12, not only when the blade 12 is drawn along the ruler 10 and cuts the sheet of material 18, but also if the blade 12 should be lifted and accidently dropped during use.

The shield 22 extends skewly rearwardly upwardly at an acute angle, and not perpendicularly, from the uppermost surface 26 of the base 20.

The shield 22 further has a pair of ends 39 that extend coplanarly-upwardly from the pair of ends 32 of the base 20, respectively.

The shield 22 further has a front surface 40 that is flat and extends skewly rearwardly upwardly from the uppermost surface 26 of the base 20, from one end 39 of the shield 22 to the other end 39 of the shield 22 so as to extend the length of the base 20, in its entirety.

The front surface 40 of the shield 22 is disposed slightly behind the leading edge 28 of the base 20 so as to form a space 42 therebetween.

The ruler 10 further comprises successive numerical indicia 41 that form a scale that extends along the space 42 on the uppermost I surface 26 of the base 20, and which is demonstrative of intervals of the length of the leading edge 28 of the base 20 for use in measuring.

The shield 22 further comprises a sheet of instructions 43 that is disposed on the front surface 40 thereof for instructing the user 16 in safely using the blade 12 in conjunction with the ruler 10.

The shield 22 further has a back surface 44 that is disposed behind the front surface 40 thereof, and extends from one end 39 of the shield 22 to the other end 39 of the shield 22.

The back surface 44 of the shield 22 has a lower portion 46 that is flat and extends vertically upwardly from the uppermost surface 26 of the base 20.

The lower portion 46 of the back surface 44 of the shield 22, together with the front surface 40 of the shield 22, forms a broadened lower portion 47 that prevents the shield 22 from being accidently pushed back and broken off the base 20.

The back surface 44 of the shield 22 further has an upper portion 48 that is flat, extends skewly rearwardly upwardly from the lower portion of the back surface 44, to the uppermost edge 38 of the shield 22.

The upper portion 48 of the back surface 44 of the shield 22 is parallel to the front surface 40 of the shield 22, and together therewith, forms a narrowed upper portion 50 that is narrower than the broadened lower portion 47 of the shield 22.

The uppermost surface 26 of the base 20 has a first recess 52 therein that is rectangular-shaped, and extends longitudinally from, and opens into, one end 32 of the base 20, to, and opens into, the other end 32 of the base 20, and laterally, at a rearmost extreme 53 thereof, from slightly forwardly of the trailing edge 30 of the base 20, to the lower portion 46 of the back surface 44 of the shield 22 so as to extend over a substantial amount of the uppermost surface 26 of the base 20.

The lowermost surface 24 of the base 20 has a second recess 54 therein that is rectangular-shaped, and extends longitudinally from, and opens into, one end 32 of the base 20, to, and opens into, the other end 32 of the base 20, and laterally from slightly forwardly of the rearmost extreme 53 of the first recess 52, to midway of the broadened lower portion 47 of the shield 22 so as to extend a substantial amount of the lowermost surface 24 of the base 20.

The base 20 further comprises a first pad of anti-skip material 56 that is continuous and completely fills the first recess 52 in the base 20 for providing cushioned comfort for, and preventing the hand 14 of the user 16 not holding the blade 12 from skipping along the base 20 when stabilizing and holding the ruler 10 down.

The first pad of anti-skip material 56 is made of rubber.

The base 20 further comprises a second pad of anti-skip material 58 that is continuous and completely fills, and extends slightly below, the second recess 54 in the base 20 for preventing the ruler 10 from skipping along the sheet of material 18 to be cut when the hand 14 of the user 16 not holding the blade 12 stabilizes and holds the ruler 10 down.

The second pad of anti-skip material 58 extending slightly below the second recess 54 in the base 20 allows for compression thereof, resulting in better traction when the hand 14 of the user 16 not holding the blade 12 stabilizes and holds the ruler 10 down.

The second pad of anti-skip material 58 is made of rubber.

The shield 22 is one-piece with the base 20, and together are, solid, durable, and made from extruded aluminum.

The shield 22 is one-piece with the base 20, and together are, solid, durable, and made from plastic.

Figure 3:
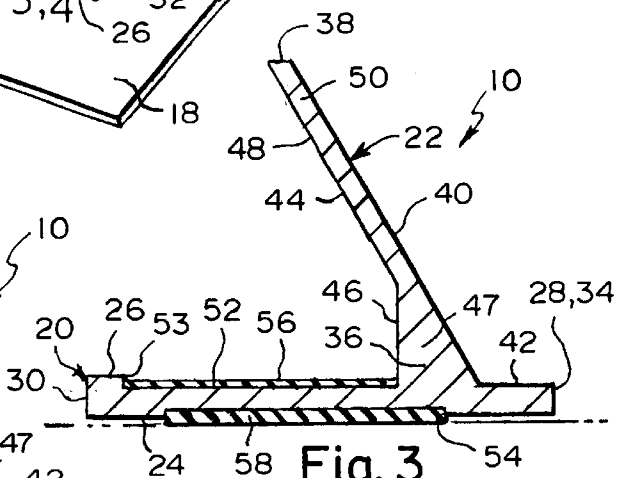
FIG. 3 is an enlarged diagrammatic cross sectional view taken on line 3—3 in FIG. 1 of a first embodiment of the present invention.

As shown in FIG. 3, the blunt leading edge 34 of the base 20 is integrally complete, that is no blade rail is necessary, when the base 20 and the shield 20 are made together from extruded aluminum, since there is no danger of the blade 12 cutting into the blunt leading edge 34 of the base 20, by virtue of the blunt leading edge 34 of the base 20 being made of extruded aluminum.

Figure 4:
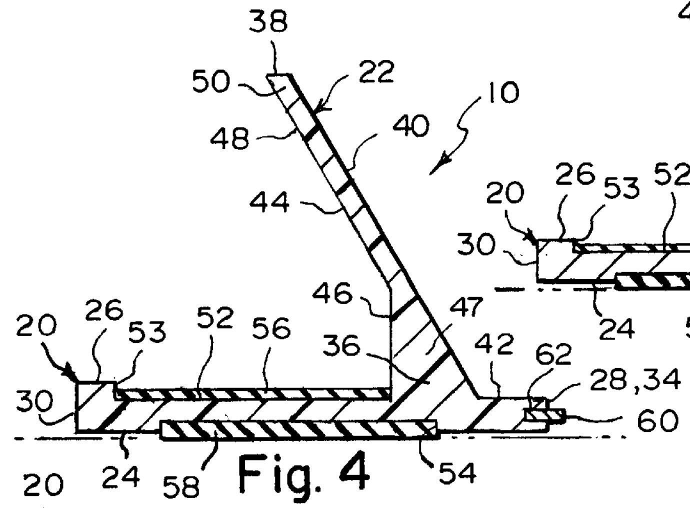
FIG. 4 is an enlarged diagrammatic cross sectional view taken on line 4—4 in FIG. 1 of a second embodiment of the present invention.
Figure 2:
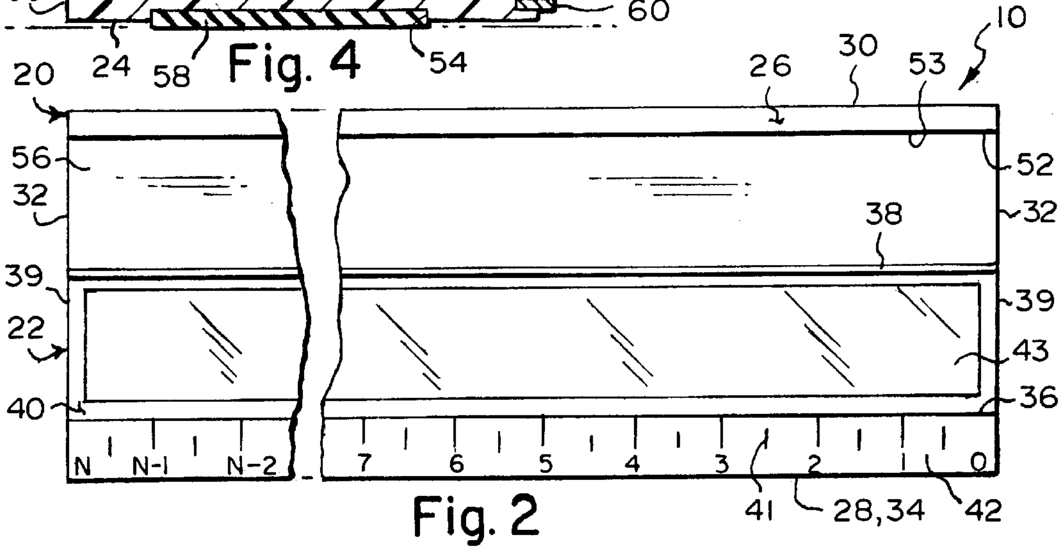
FIG. 2 is an enlarged diagrammatic top plan view taken generally in the direction of arrow 2 in FIG. 1.

As shown in FIG. 4, the blunt leading edge 34 of the base 20 is supplemented with a blade rail 60 when the base 20 and the shield 22 are made together from plastic, since there is a danger of the blade 12 cutting into the blunt leading edge 34 of the base 20, by virtue of the blunt leading edge 34 of the base 20 being made of plastic.

The blade rail 60 is made of a strip of metal.

The blunt leading edge 34 of the base 20 has a blindslot 62 that extends completely therealong and horizontally therein, a distance to receive a portion of the blade rail 60 sufficient to hold the blade rail 60 therein while allowing a remaining portion of the blade rail 60 to project past the blunt leading edge 34 of the base 20 for guiding the blade 12.

It will be understood that each of the elements described above, or two or more together, may also find a useful application other types of constructions differing from the types described above.

While the invention has been illustrated and described as embodied in a ruler for guiding a blade and for providing shielding protection for the hand of a user not holding the blade from the blade, not only when the blade is drawn along the ruler and cuts a sheet, but also if the blade should be lifted and accidently dropped during use, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

What is claimed is:

1. A ruler for guiding a blade and for providing shielding protection from the blade for the hand of a user not holding the blade, not only when the blade is drawn along said ruler and cuts a sheet of material, but also if the blade should be lifted and accidentally dropped during use, said ruler comprising:

a) a base for overlying the sheet of material to be cut and for guiding the blade; and b) a shield extending upwardly from said base for facilitating carrying and placing of said ruler and for providing shielding protection from the blade for the hand of the user not holding the blade, not only when the blade is drawn along said ruler and cuts the sheet of material, but also if the blade should be lifted and accidentally dropped during use, wherein said base has:

A) a length;

B) a lowermost surface that is flat for overlying the sheet of material to be cut;

C) an uppermost surface that is flat, and disposed above, and parallel to, said lowermost surface thereof for having the hand of the user not holding the blade engage thereupon;

D) a leading edge that has a length and is straight for guiding the blade;

E) a trailing edge that is straight, and disposed behind, and parallel to, said leading edge thereof; and F) a pair of ends that are straight and parallel to each other and perpendicular to both said leading edge thereof and said trailing edge thereof, by virtue of said base being rectangular-shaped, wherein said shield extends skewly rearwardly upwardly, at a lowermost edge thereof that is straight, from said uppermost surface of said base, to an uppermost edge thereof that is straight and at an elevation above the hand of the user not holding the blade for allowing said shield to cover, and isolate, the hand of the user not holding the blade, and as a result thereof, said shield provides shielding protection from the blade for the hand of the user not holding the blade, not only when the blade is drawn along said ruler and cuts the sheet of material, but also if the blade should be lifted and accidently dropped during use, wherein said shield further has a pair of ends that extend coplanarly-upwardly from said pair of ends of said base, respectively, wherein said shield further has a front surface that is flat and extends skewly rearwardly upwardly from said uppermost surface of said base, from one end of said shield to the other end of said shield so as to extend said length of said base, in its entirety, wherein said shield further has a back surface that is disposed behind said front surface thereof, and extends from one end of said shield to the other end of said shield, wherein said back surface of said shield has a lower portion that is flat and extends vertically upwardly from said uppermost surface of said base, wherein said uppermost surface of said base has a first recess therein that is rectangular-shaped, and extends longitudinally from, and opens into, one said end of said base, to, and opens into, the other said end of said base, and laterally, at a rearmost extreme thereof, from slightly forwardly of said trailing edge of said base, to said lower portion of said back surface of said shield so as to extend over a substantial amount of said uppermost surface of said base, wherein said base further comprises a first pad of anti-skip material that is continuous and completely fills said first recess in said base for providing cushioned comfort for, and preventing the hand of the user not holding the blade from skipping along said base when stabilizing and holding said ruler down.

2. The ruler as defined in claim 1, wherein said base is rigid, elongated, thin, flat, and rectangular-shaped.

3. The ruler as defined in claim 1, wherein said leading edge of said base is blunt so as to form a blunt leading edge for preventing the blade from deflecting relative rearwardly should a minute deviation in alignment of the blade occur during use, as opposed to being beveled, which would cause the blade to deflect relative rearwardly should a minute deviation in alignment of the blade occur during use, and as a consequence thereof, cause injury to the hand of the user.

4. The ruler as defined in claim 3, wherein said blunt leading edge of said base is integrally complete when said base and said shield are made together from extruded aluminum, since there is no danger of the blade cutting into said blunt leading edge of said base, by virtue of said blunt leading edge of said base being made of extruded aluminum.

5. The ruler as defined in claim 3, wherein said blunt leading edge of said base is supplemented with a blade rail when said base and said shield are made together from plastic, since there is a danger of the blade cutting into said blunt leading edge of said base, by virtue of said blunt leading edge of said base being made of plastic.

6. The ruler as defined in claim 5, wherein said blade rail is made of a strip of metal.

7. The ruler as defined in claim 5, wherein said blunt leading edge of said base has a blindslot that extends completely therealong and horizontally therein, a distance to receive a portion of said blade rail sufficient to hold said blade rail therein while allowing a remaining portion of said blade rail to project past said blunt leading edge of said base for guiding the blade.

8. The ruler as defined in claim 1, wherein said shield extends skewly rearwardly upwardly at an acute angle from said uppermost surface of said base, as opposed to perpendicularly, which would not allow said shield to cover, and isolate, the hand of the user not holding the blade, and as a result thereof, said shield would not provide shielding protection from the blade for the hand of the user not holding the blade, not only when the blade is drawn along said ruler and cuts the sheet of material, but also if the blade should be lifted and accidently dropped during use.

9. The ruler as defined in claim 1, wherein said front surface of said shield is disposed slightly behind said leading edge of said base so as to form a space therebetween.

10. The ruler as defined in claim 9; further comprising successive numerical indicia forming a scale extending along said space on said uppermost surface of said base and being demonstrative of intervals of said length of said leading edge of said base for use in measuring.

11. The ruler as defined in claim 1, wherein said shield further comprises a sheet of instructions that is disposed on said front surface thereof for instructing the user in safely using the blade in conjunction with said ruler.

12. The ruler as defined in claim 1, wherein said lower portion of said back surface of said shield, together with said front surface of said shield, forms a broadened lower portion that prevents said shield from being accidently pushed back and broken off said base.

13. The ruler as defined in claim 12, wherein said back surface of said shield further has an upper portion that is flat, extends skewly rearwardly upwardly from said lower portion of said back surface, to said uppermost edge of said shield.

14. The ruler as defined in claim 13, wherein said upper portion of said back surface of said shield is parallel to said front surface of said shield, and together therewith, forms a narrowed upper portion that is narrower than said broadened lower portion of said shield.

15. The ruler as defined in claim 1, wherein said lowermost surface of said base has a second recess therein that is rectangular-shaped, and extends longitudinally from, and opens into, one said end of said base, to, and opens into, the other said end of said base, and laterally from slightly forwardly of said rearmost extreme of said first recess, to midway of said lower portion of said shield so as to extend a substantial amount of said lowermost surface of said base.

16. The ruler as defined in claim 15, wherein said base further comprises a second pad of anti-skip material that is continuous and completely fills, and extends slightly below, said second recess in said base for preventing said ruler from skipping along the sheet of material to be cut when the hand of the user not holding the blade stabilizes and holds said ruler down, wherein said second pad of anti-skip material extending slightly below said second recess in said base allows for compression thereof, resulting in better traction, when the hand of the user not holding the blade stabilizes and holds said ruler down.

17. The ruler as defined in claim 16, wherein said second pad of anti-skip material is made of rubber.

18. The ruler as defined in claim 1, wherein said first pad of anti-skip material is made of rubber.

19. The ruler as defined in claim 1, wherein said shield is one-piece with said base, and together are, solid, durable, and made from extruded aluminum.

20. The ruler as defined in claim 1, wherein said shield is one-piece with said base, and together are, solid, durable, and made from plastic.

* * * * *